(12) United States Patent
Updegrove

(10) Patent No.: US 6,879,547 B1
(45) Date of Patent: Apr. 12, 2005

(54) COMBINED STABILIZATION BRACKET AND MINE SYSTEM FOR GATHERING UNDERSEA DATA

(75) Inventor: Darryl Updegrove, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 73 days.

(21) Appl. No.: 10/627,196

(22) Filed: Jul. 24, 2003

Related U.S. Application Data

(63) Continuation of application No. 10/042,842, filed on Jan. 11, 2002, now abandoned.

(51) Int. Cl.[7] .............................. G01V 1/38; G01V 1/00
(52) U.S. Cl. ....................................... 367/173; 367/188
(58) Field of Search .............................. 367/15, 16, 17, 367/18, 169, 173, 188; 181/122, 401

(56) References Cited

U.S. PATENT DOCUMENTS 3,704,764 A * 12/1972 Henderson .................. 367/188
4,007,436 A * 2/1977 McMahon ................... 367/173
4,138,658 A * 2/1979 Avedik et al. ................ 367/15
5,231,252 A * 7/1993 Sansone ...................... 181/122
5,434,828 A * 7/1995 Logan ......................... 367/188
5,696,738 A * 12/1997 Lazauski .................... 367/188

* cited by examiner

Primary Examiner—Ian J. Lobo
(74) Attorney, Agent, or Firm—James T. Shepherd

(57) ABSTRACT

A combination stabilizer system and cylindrical-shaped undersea package improves validity of data collected from ambient sea by orienting the package in an upright attitude and eliminating motion or rocking due to wave action and/or sea currents. An outrigger base assembly has a flat base surface to rest on the sea floor and is provided with upper surfaces having semi-circular cross-sectional configurations to contiguously fit adjacent to round outer contours of an undersea package. The outrigger base assembly also has laterally extending outrigger portions extending the flat base surface for increased stability. First and second case clamps have curved surfaces with semi-circular cross-sectional configurations that extend above the outrigger base assembly. The first and second clamps clamp the curved surfaces and upper surfaces onto the round contours and secure the undersea package in an upright orientation.

5 Claims, 2 Drawing Sheets

COMBINED STABILIZATION BRACKET AND MINE SYSTEM FOR GATHERING UNDERSEA DATA

CROSS REFERENCE TO RELATED APPLICATION

This application is a continuation of U.S. patent application Ser. No. 10/042,842, filed Jan. 11, 2002, now abandoned, entitled "Attachable stabilization Bracket for Versatile Mine System" and assigned to the Government of the United States of America.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a stabilizer for a mine emulation system deployed underwater. More particularly, the stabilizer bracket of this invention can be quickly mounted on a cylindrically-shaped underwater mine emulation system to stabilize and orient it in a predetermined fixed attitude to improve the quality of gathered data.

Acoustic/seismic, magnetic, and pressure data is collected underwater by numbers of different sensors that usually are contained in one or more housings. The housings are commonly made in cylindrical shapes to protect the sensors and interconnected processing modules from the effects of the ambient water during the long periods of time that sometimes must be spent to collect meaningful amounts of data. The housings additionally must be stable and not move since random or uncompensated motion can compromise the quality, or even the validity of the gathered data.

One technique currently used to stabilize the cylindrical-shaped housings is to put a dense, heavy weight on one side of the housing. This side that is weighted would nominally be considered the underside since the force of gravity would bring it to rest on the ocean bottom. However, because the cylindrical shape defines a curved outer surface, the housing is still prone to move, or rock due to wave action and/or sea currents. It has been noted that noise was present in the magnetic data, and this noise was created by sea currents/wave action rocking the housing about its cylindrical, or longitudinal axis.

Thus, in accordance with this inventive concept, a need has been recognized in the state of the art for an effective means that can be easily connected to a cylindrical-shaped housing to stabilize and orient it on the ocean floor.

OBJECTS AND SUMMARY OF THE INVENTION

An object of the invention is to stabilize and orient a cylindrical-shaped housing for sensors on the ocean floor.

Another object is to provide a stabilization structure for the cylindrical-shaped mine emulation system to eliminate movement caused by wave action and/or sea currents.

Another object is to provide stabilization structure that is easily attached and removed by simple tools.

Another object is to provide a stabilization structure having an outrigger design to create a flat bottom for a cylindrical instrumentation housing to enhance its ability to remain stable in high sea states and in strong currents.

Another object is to provide a cost-effective stabilizing structure for a cylindrical housing made from materials resistant to the harsh marine environment.

These and other objects of the invention will become more readily apparent from the ensuing specification when taken in conjunction with the appended claims.

Accordingly, the invention stabilizes a cylindrical-shaped undersea package on the sea floor. An outrigger base assembly has a flat base surface to rest on the sea floor and an upper surface having a semi-circular cross-sectional configuration to contiguously fit adjacent to round outer contours of the undersea package. The outrigger base assembly has outrigger portions to laterally extend the flat base surface. First and second case clamps have curved surfaces with semi-circular cross-sectional configurations to extend above the outrigger base assembly. The first and second clamps clamp the curved surfaces onto the round contours of the undersea package and the upper surface of the outrigger base assembly onto the round contours of the undersea package. The first and second case clamps secure the undersea package in an upright orientation and resist tendencies for motion by waves and/or currents.

DESCRIPTION OF THE PREFERRED EMBODIMENT

Figure 1:
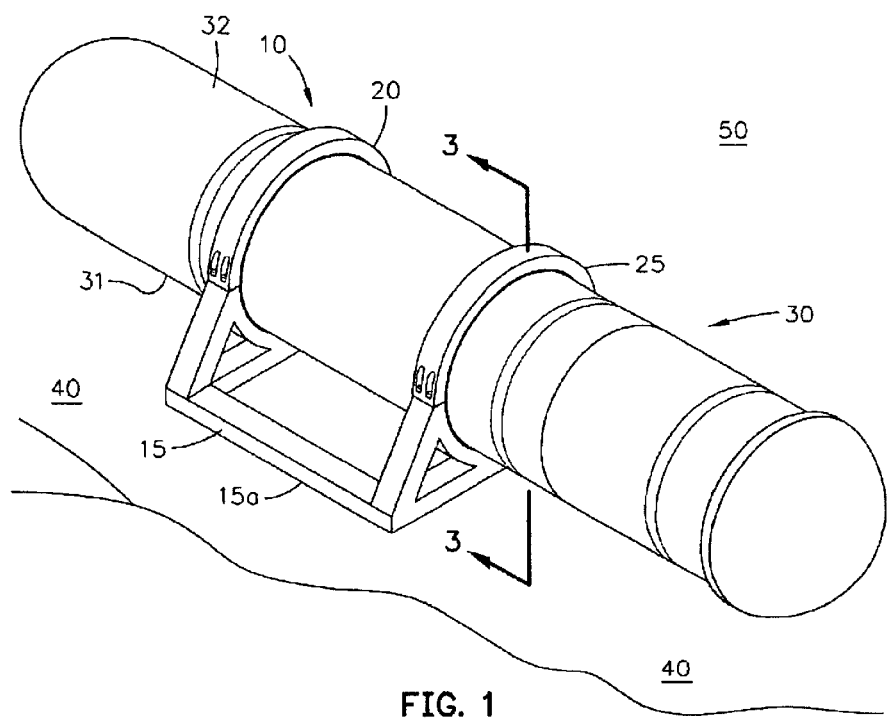
FIG. 1 is a schematic representation of the stabilizer assembly of the invention installed on an undersea instrumentation package, for example a versatile exercise mine system (VEMS) on the sea floor.

Referring to FIG. 1, stabilizer system 10 of the invention is installed on an undersea instrumentation package, for example a versatile exercise mine system (VEMS) 30. VEMS 30 is shown on the bottom, or sea floor 40 of a body of water 50 after it has been dropped or otherwise deployed such as by cable (not shown) from a surface vessel or aircraft. On sea floor 40 VEMS 30 will power-up and collect acoustic/seismic, magnetic, and pressure data and emulate various real mines.

VEMS 30 can be an exercise mine, for example the elongate, cylindrical-shaped MARK 74 VEMS of the U.S. Navy, that is designed to be placed into the ocean and rest on the floor, where it will power up and collect acoustic/seismic, magnetic, and pressure data and emulate various real mines. By emulating the mines, VEMS 30 will retrieve data from its sensors and, via software, analyze the data to determine if the mine VEMS 30 is emulating would have actuated from the signals received.

Heretofore, VEMS 30 has been internally weighted so that the force of gravity would cause one rounded contour 31 of its rounded, cylindrically-shaped housing 32 to come to rest on bottom 40 and tend to stay in this orientation. However, practical experience indicates that VEMS 30 is sensitive to wave action and/or sea currents that push against its sides and cause it to rock back and forth on rounded contour 31. This rocking motion affects triaxial magnetic sensors in VEMS 30, since they then move relative to the earth's background magnetic field. To these sensors, the rocking motion can appear as fluctuating background noise levels (fluctuations occur at frequencies associated with the frequencies of the back and forth motions of VEMS 30). This background noise level can be mistaken as emulations of a mine run by the VEMS 30 as a potential target, or the background noise level could mask a low level target so that VEMS 30 does not recognize it as a target. By stabilizing VEMS 30 with stabilization system 10, the magnetic sensors will not move, and consequently the earth's background magnetic field should appear to the sensors to be stable.

Figure 2:
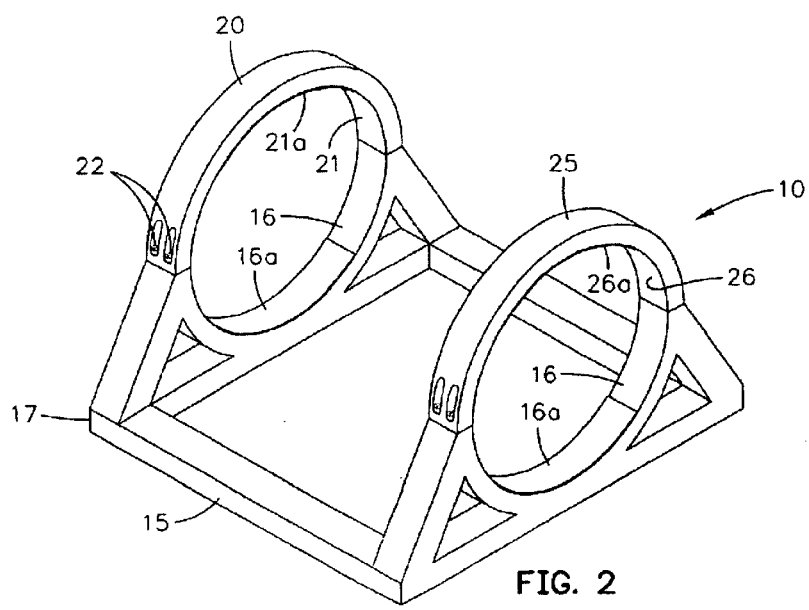
FIG. 2 is an isometric, schematic representation of the stabilizer assembly removed from the VEMS.
Figure 3:
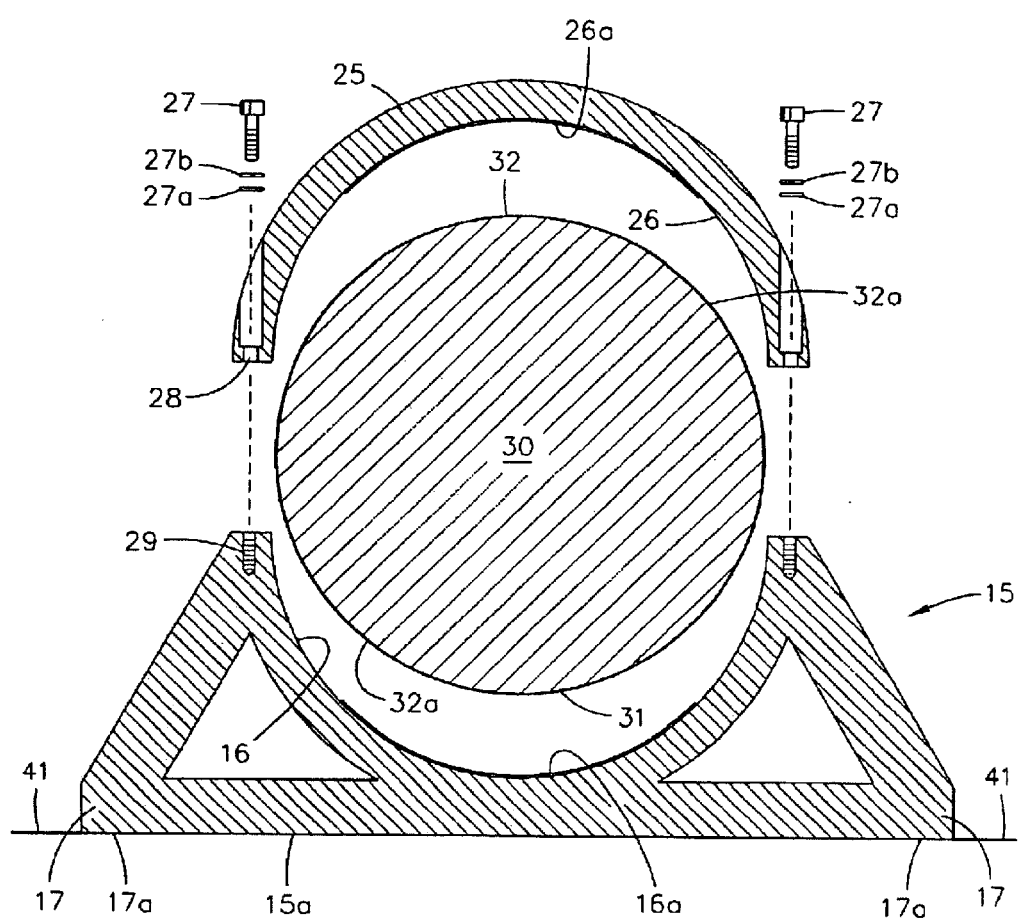
FIG. 3 is a partially exploded view taken along line 3—3 in FIG. 1 showing details of the stabilizer assembly.

Referring also to FIGS. 2 and 3, in accordance with this invention stabilization system 10 secures an outrigger base assembly 15 to VEMS 30 by a pair of stabilizing case clamps 20 and 25 wrapped around and engaging VEMS 30. Stabilizing case clamps 20 and 25 extend parallel with respect to one another and are longitudinally separated from each other along VEMS 30. Typically, stabilization system 10 is mounted on VEMS 30 in an assembly area prior to deployment by placing a flat base surface 15a of outrigger base assembly 15 on a flat surface 41 beneath VEMS 30 that has been raised by an overhead crane (not shown). The overhead crane lowers VEMS 30 onto outrigger base assembly 15, and after proper orientation of VEMS 30 has been verified, the two stabilizing case clamps 20 and 25 are placed across the top of VEMS 30. Case clamps 20 and 25 are secured to outrigger base assembly 15 by bolts 22 and 27, respectively. FIG. 3 shows bolts 27 extending through holes 28 in case clamp 25, to engage mating threaded bores 29 in assembly 15. Although not shown, it is understood that like bolts 27, bolts 22 also extend through similar holes in clamp 20 to engage similar threaded bores in assembly 15. Tightening bolts 22 and 27 in their respective bores causes case clamps 20 and 25 and outrigger base assembly 15 to securely grip, or clamp onto and engage VEMS 30. Installation of stabilizer system 10 on VEMS 30 is now complete. Disassembly is the reverse procedure of this process of assembly.

Outrigger base assembly 15 has upper surfaces 16 being essentially semi-circular cross-sectional shaped to fit contiguously adjacent to the essentially circular cross-sectional shape of the outer contours 32a of VEMS 30 and has laterally extending outrigger portions 17 that extend flat base surface 15a. Stabilizing case clamps 20 and 25 extend above outrigger base assembly 15 between outrigger portions 17 to clamp VEMS 30 to outrigger base assembly 15 and securely orient VEMS 30 in an upright, or other fixed orientation with respect to sea floor 40. Stabilizing case clamps 20 and 25 do this when bolts 22 and 27 are tightened to cause a firm gripping engagement on outer contours 32a of VEMS 30 along curved surfaces 21 and 26 that each has an essentially semi-circular cross-sectional shape. Thus, the orientation of VEMS 30 with respect to sea floor 40 (or the relative angle between outrigger base assembly 15 and VEMS 30 or another external reference) is fixed and does not change throughout the period of an operational deployment while data is being gathered.

The design and construction of the stabilizer system 10 are uncomplicated to lower construction costs. Outrigger base assembly 15 and stabilizer base clamps 20 and 25 can be suitably constructed of strong aluminum, stainless steel, or other materials that can handle the expected loads induced by water entry and coming to rest against bottom 40, and bear the weight of VEMS 30. The materials are chosen to be non-corrosive, or corrosion resistant so as not to be affected by salt water. Stabilizer system 10 is not intended to be a lifting mechanism or hard point for deployment of VEMS 30. Other hard points and/or connecting structure (not shown) associated with VEMS 30 are used for deployment to sea floor 40. Outrigger base assembly 15 is built to be sufficiently strong to support the weight of VEMS 30 on sea floor 40 with the attached stabilizer system 10.

FIG. 3 shows threaded bolts 27, flat washers 27a, and lock washers 27b as attachment hardware for stabilizing case clamp 25. Although flat washers, lock washers, holes, and threaded bores associated with bolts 22 are not shown it is understood that stabilizing case clamp 20 also can be connected to outrigger base assembly 15 in this manner. Other mechanisms to connect stabilizing case clamps 20 and 25 to the outrigger base assembly 15 might be chosen, such as hinges, over-center latches, captive pins, etc. Stabilizing case clamps 20 and 25 and/or outrigger base assembly 15 could also utilize rubber pads, or other resiliently engaging means 21a, 26a, and 16a to prevent damage to VEMS 30 and its protective coating, and to provide additional gripping frictional force. Stabilizing case clamps 20 and 25 can have a variety of cross-sectional shapes, such as square, triangular, circular, elliptical, for examples. Outrigger base assembly 15 can be made from different stock including square tube, round tube, I-beams, C-beams, or other cross-sectional shapes. An exemplary VEMS 30 having a diameter of 21.0 inches can have outrigger base assembly 15 and stabilizing case clamps 20 and 25 shaped to have an inner radius of 10.5 inches to accommodate the exemplary VEMS 30. The length and width of outrigger base assembly 15 should be the maximum practical length so as not to interfere with detachable hardware or sensors or access ports on the exemplary VEMS 30. Therefore, outrigger base assembly 15 of stabilizer system 10 provides a flat bottom for VEMS 30 and greatly enhances the ability of VEMS 30 to remain stable even in high sea states or locations where strong sea currents are prevalent.

Having the teachings of this invention in mind, different applications, modifications and alternate embodiments of this invention may be adapted. Stabilizer system 10 can be made in larger or smaller sizes and in a multitude of different shapes, and could be made from a wide variety of materials. In other words, the design and construction of stabilizer system 10 allows for accommodation of different underwater systems other than the cylindrical shape of VEMS 30 by substituting differently dimensioned and shaped components. Stabilizer system 10 of the invention can easily be removed and reinstalled if necessary, and simple tools are all that are required to perform this operation. Optionally, the reliable, uncomplicated and cost effective design of stabilizer system 10 can permit its non-recyclable use to stabilize undersea packages. Other modifications could be made as will be apparent to one skilled in the art to which this invention pertains.

The disclosed components and their arrangements as disclosed herein all contribute to the novel features of this invention. Stabilizer system 10 of this invention is an effective improvement that can be readily connected or disconnected to enable its addition or removal from VEMS 30 without undue effort. Therefore, stabilizer system 10, as disclosed herein is not to be construed as limiting, but rather, is intended to be demonstrative of this inventive concept.

It should be readily understood that many modifications and variations of the present invention are possible within the purview of the claimed invention. It is to be understood that within the scope of the appended claims the invention may be practiced otherwise than as specifically described.

I claim:

1. The combination of a cylindrically-shaped instrumentation package for collecting data from ambient sea and a laterally extending stabilizer comprising:

a cylindrically-shaped instrumentation package for collecting data from said ambient sea, said cylindrically-shaped instrumentation package having round outer contours and being placed on the floor of said sea, said data collecting being adversely affected by lateral rocking motion thereof;

a laterally extending stabilizer having an outrigger base assembly having a flat base surface for resting on said sea floor, upper surfaces joined to said flat base surface having a semi-circular cross-sectional configuration to contiguously fit adjacent to one part of said round outer contours of said cylindrically-shaped instrumentation package, and outrigger portions extending said flat base surface laterally beyond said cylindrically-shaped instrumentation package; and first and second case clamps provided with curved surfaces having semi-circular cross-sectional configurations and extending above said outrigger base assembly, said first and second clamps being shaped to clamp said curved surfaces onto another part of said round outer contours of said cylindrically-shaped instrumentation package and said upper surfaces of said outrigger base assembly onto said one part of said round contours of said cylindrically-shaped instrumentation package to secure said cylindrically-shaped instrumentation package in a fixed orientation free from said lateral rocking motion on said sea floor.

2. The combination of claim 1 wherein said first and second clamps are parallel with one another, said cylindrically-shaped instrumentation package is an elongate, cylindrically-shaped emulator of mines, and said first and second clamps are longitudinally spaced apart from one another on said cylindrically-shaped emulator.

3. The combination of claim 2 further comprising:

a plurality of threaded bolts extending through holes in said first and second clamps to engage mating threaded bores in said outrigger base assembly to hold said cylindrically-shaped emulator in said fixed orientation free from said lateral rocking motion.

4. The combination of claim 3 further comprising:

resilient pads on said upper surfaces of said outrigger base assembly and said curved surfaces of said first and second clamps, said resilient pads engaging said cylindrically-shaped emulator.

5. The combination of claim 4 wherein said outrigger portions of said outrigger base assembly laterally extend beyond said cylindrically-shaped emulator to increase stability.

\* \* \* \* \*